(12) United States Patent
Epshetsky et al.

(10) Patent No.: US 9,027,928 B2
(45) Date of Patent: May 12, 2015

(54) PUMPING SEAL HAVING PROJECTIONS FOR AXIALLY POSITIONING A BIASING MEMBER

(71) Applicants: Yefim Epshetsky, Schaumburg, IL (US); Alex Paykin, Buffalo Grove, IL (US)

(72) Inventors: Yefim Epshetsky, Schaumburg, IL (US); Alex Paykin, Buffalo Grove, IL (US)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 14/367,101

(22) PCT Filed: Dec. 17, 2012

(86) PCT No.: PCT/US2012/070011
§ 371 (c)(1),
(2) Date: Jun. 19, 2014

(87) PCT Pub. No.: WO2013/096160
PCT Pub. Date: Jun. 27, 2013

(65) Prior Publication Data
US 2015/0069713 A1    Mar. 12, 2015

Related U.S. Application Data

(60) Provisional application No. 61/578,025, filed on Dec. 20, 2011.

(51) Int. Cl.
*F16J 15/32*    (2006.01)

(52) U.S. Cl.
CPC .................. *F16J 15/3208* (2013.01)

(58) Field of Classification Search
CPC ...... F16J 15/32; F16J 15/3204; F16J 15/3208
See application file for complete search history.

(56) References Cited

U.S. PATENT DOCUMENTS

| | | | | |
|---|---|---|---|---|
| 3,921,992 A | * | 11/1975 | Bertin | 277/560 |
| 4,577,874 A | * | 3/1986 | Zitting | 277/584 |
| 4,750,748 A | * | 6/1988 | Visser | 277/561 |

\* cited by examiner

*Primary Examiner* — Gilbert Lee
(74) *Attorney, Agent, or Firm* — Mark Ussai; SKF USA Inc. Patent Dept.

(57) ABSTRACT

A seal assembly is for sealing between a housing and a rotary shaft includes an annular sealing member coupled with the housing and having inner and outer circumferential surfaces and a plurality of projections extending radially from the outer surface and spaced circumferentially about a central axis. Each projection has first and second axial ends and the plurality of projections define first and second projections. An annular biasing member is disposed about the sealing member outer surface and exerts an inwardly directed force on the sealing member. The biasing member has first and second ends and is arranged on the sealing member with the biasing member first end contacting the second end of each first projection and the biasing member second end contacting the first end of each second projection. As such, the biasing member extends axially and circumferentially between the first and second projections.

15 Claims, 8 Drawing Sheets

PUMPING SEAL HAVING PROJECTIONS FOR AXIALLY POSITIONING A BIASING MEMBER

BACKGROUND OF THE INVENTION

The present invention relates to seals, and more particularly to radial seals for sealing a space about a rotatable shaft.

Radial shaft seals are generally known and typically include a seal member with an inner circumferential "sealing surface", which may be provided by an annular lip or a cylindrical portion of the seal member, that is engageable with the exterior surface of a shaft. As the shaft rotates within the seal, the sealing surface remains in sliding contact with the shaft outer surface to prevent the migration of substances (e.g., oil, debris particles) through a sealed space. Typically, to provide sufficient sealing pressure and to account for variations in the shaft and seal dimensions and/or misalignments, such seal assemblies are often provided with a biasing member (e.g., a garter spring) to "force" the seal member into engagement with the shaft.

Further, some seal assemblies are provided with a seal member having a formed surface (e.g., sine wave-shaped) that creates a "pumping effect" to remove any substances that become disposed between the sealing surface and the shaft surface. Typically, such pumping seal assemblies are more costly to manufacture than a conventional "non-pumping" seal assembly due to the additional fabrication necessary to create the pumping effect.

SUMMARY OF THE INVENTION

In one aspect, the present invention is a seal assembly for sealing a space between a housing and a rotary shaft disposed at least partially within the housing. The seal assembly comprises a generally annular sealing member coupled with the housing and having a central axis, inner and outer circumferential surfaces and a plurality of projections. The projections extend generally radially outwardly from the outer surface and are spaced circumferentially apart about the central axis. Each projection has opposing first and second axial ends and the plurality of projections defining at least one first projection and at least one second projection. Further, a generally annular biasing member is disposed about the sealing member outer surface and configured to exert a radially-inwardly directed force on the sealing member. The biasing member has opposing first and second ends and is arranged on the sealing member with the biasing member first end contacting the second end of each first projection and the biasing member second end contacting the first end of each second projection. As such, the biasing member extends axially and circumferentially between the first and second projections.

In another aspect, the present invention is a method of pumping fluid with a seal assembly for sealing a space between a rotatable shaft and a housing, the pumping method comprising the steps of: providing a generally annular sealing member having a central axis, inner and outer circumferential surfaces, at least a portion of the inner surface providing a sealing surface with opposing axial ends, and a plurality of projections extending generally radially outwardly from the outer surface and spaced circumferentially apart about the central axis, each projection having opposing first and second axial ends and the plurality of projections defining at least one first projection and at least one second projection; providing a generally annular biasing member having opposing first and second ends and configured to exert a radially-inwardly directed force when deflected radially outwardly; mounting the sealing member on the shaft such that the sealing surface is engaged with the outer surface of the shaft so as to define a sealing interface; mounting the biasing member on the sealing member such that the biasing member first end contacts the second end of each first projection and the biasing member second end contacts the first end of each second projection so that the biasing member extends axially and circumferentially between the first and second projections, the biasing member exerting the radially-inwardly directed force on the sealing member such that the force generates a contact pressure between the sealing member and the shaft within the sealing interface; and rotating the shaft within the seal such that the contact pressure directs any fluid entering the sealing interface toward a proximal one of the two axial ends of the sealing surface.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the word "connected"

or "coupled" is intended to include direct connections between two members without any other members interposed therebetween and indirect connections between members in which one or more other members are interposed therebetween. The terminology includes the words specifically mentioned above, derivatives thereof, and words of similar import.

Figure 10:
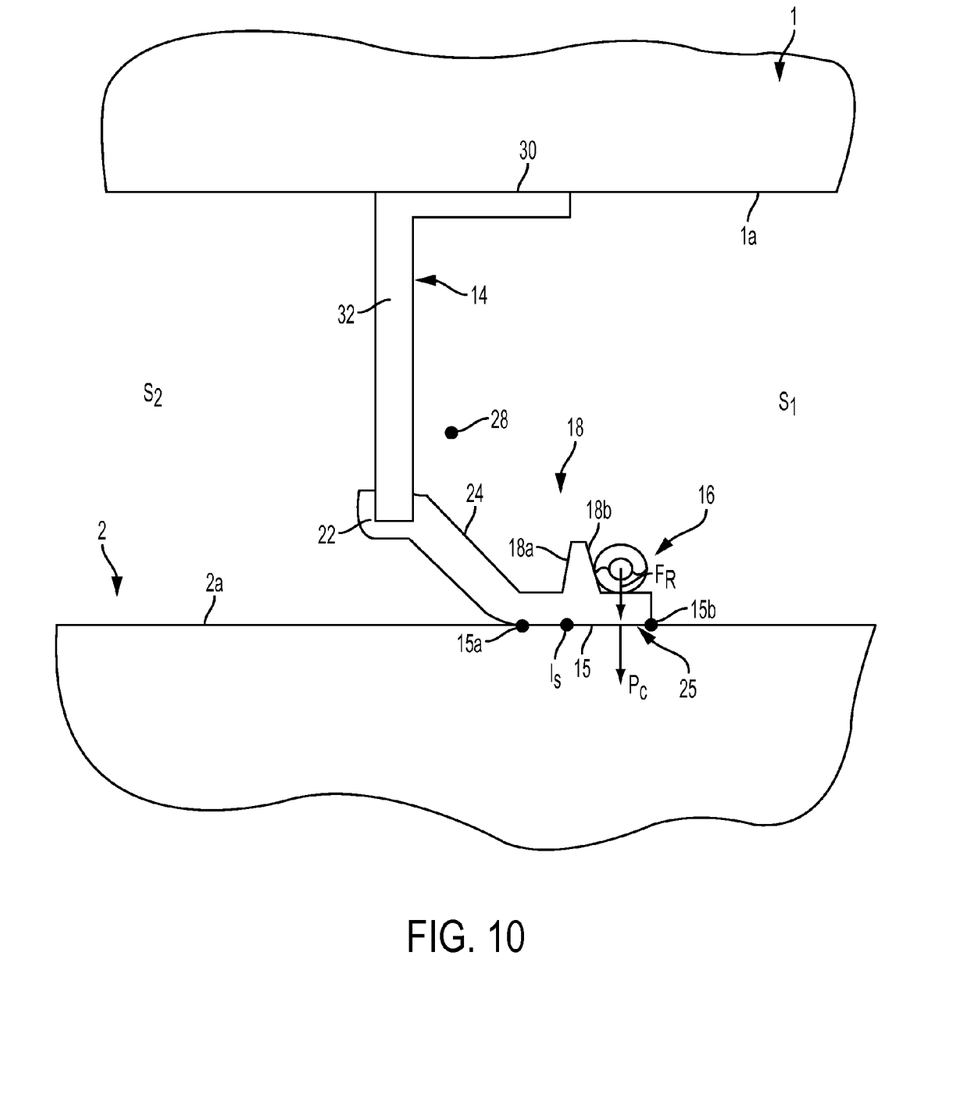
FIG. 10 is an enlarged, broken-away axial cross-sectional view of an upper portion of an alternative construction of the seal assembly of the present invention, shown as a wafer seal.

Referring now to the drawings in detail, wherein like numbers are used to indicate like elements throughout, there is shown in FIGS. 1-10 a pumping seal assembly 10 for sealing a space S between a housing 1 and a rotary shaft 2 having an outer surface 2a and a central axis $A_C$, the shaft 2 being disposed at least partially within the housing 1. The pumping seal assembly 10 basically comprises a generally annular sealing member 12 coupled with the housing 1, preferably through a casing 14 as described below, and a generally annular biasing member 16 disposed about the sealing member 12. The seal assembly 10 may be a modified version of a conventional radial shaft seal (e.g., radial lip seal), as shown in FIGS. 1-9, or may be a modified version of a "wafer" type seal, as depicted in FIG. 10. In any case, the sealing member 12 has a central axis $A_S$, inner and outer circumferential surfaces 13A, 13B, respectively, and a plurality of projections 18 extending generally radially outwardly from the outer surface 13B and spaced circumferentially apart about the central axis $A_S$. Each projection 18 is preferably formed as generally rectangular tab or lug having opposing, circumferentially-extending radial surfaces providing opposing first and second axial ends 18a, 18b, and the plurality of projections 18 define at least one first projection 20A and at least one second projection 20B, as discussed in detail below. Preferably, the projections 18 are integrally formed with the sealing member 12, but may alternatively be separate components attached to the member 12 and may be formed in any appropriate shape. Further, at least section of the sealing member inner surface 13B provides a sealing surface 15 having opposing axial ends 15a, 15b and being slidably contactable with the shaft outer surface 2a so as to define a sealing interface $I_S$. The sealing member 12 substantially prevents the flow or passage of solid, liquid or gaseous substances through the sealing interface $I_S$ so as to maintain separation between the two sides $S_1$, $S_2$ of the seal 10, which may be an air side $S_1$ and oil side $S_2$, a first liquid side $S_1$ and a second liquid side $S_2$, etc., depending on the application of the particular seal 10.

Furthermore, the biasing member 16 is disposed about the sealing member outer surface 19A and is deflectable (i.e., expandable or "stretchable") in a radially-outward direction. Being deflectable/expandable in this manner, the biasing member 16 is thereby configured to exert a radially-inwardly directed force $F_R$ on the sealing member 12, the force $F_A$ generating a contact pressure $P_C$ between the sealing member 12 and the shaft 2 within the sealing interface $I_S$. Preferably, the biasing member 16 is a garter spring, but may alternatively be an elastomeric ring or any other component capable of functioning generally as described herein. In any case, the biasing member 16 has opposing first and second ends 16a, 16b, respectively, and is arranged on the sealing member 12 with the biasing member first end 16a contacting the second end 18b of each first projection 19A and the biasing member second end 16b contacting the first end 18a of each second projection 19B. As such, the biasing member 16 extends both axially and circumferentially between the first and second projections 19A, 19B so that contact pressure $P_C$ extends at least partially along the shaft axis $A_C$ (i.e., axially).

With such a pressure distribution, the seal contact pressure $P_C$ directs a substance entering the sealing interface $I_S$ toward a proximal one of the two axial ends 15a, 15b of the sealing surface 15 when the shaft 2 rotates about the central axis $A_C$. Thus, substances entering the sealing interface $I_S$ are directed or "pumped" back toward the seal side $S_1$, $S_2$ from which the substance entered, thereby maintaining the integrity of the seal assembly 10. It must be noted that the functioning of the seal assembly 10 is described and depicted herein with reference to single or discrete points $p_1$ or $p_2$ on the shaft 2 for purposes of convenience and to facilitate understanding of the basic seal operation, and that substances which are distributed or spread over a relatively large section of the shaft outer surface 2a (e.g., seeping fluids such as oil) are pumped/directed out of the seal interface $I_S$ in the same manner as discussed above and described in further detail below.

Figure 3:
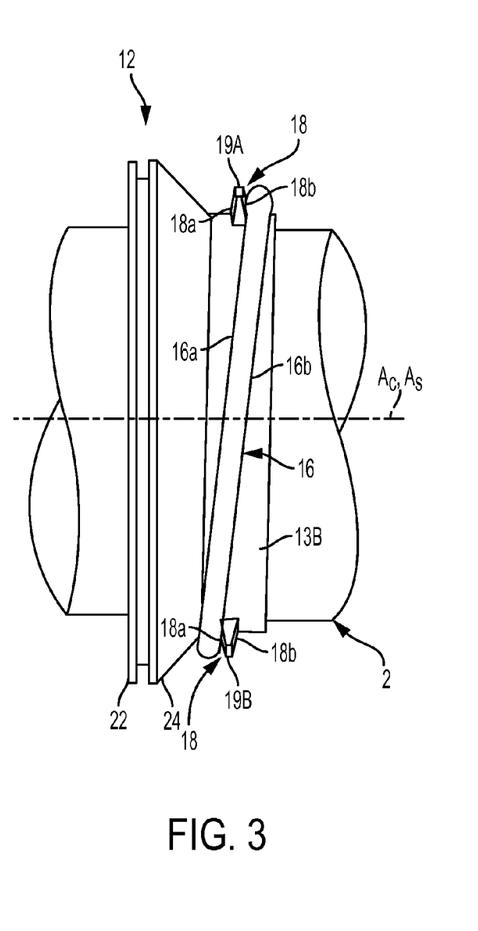
FIG. 3 is a side view of a first construction sealing member and biasing member mounted on a shaft, shown separate from a casing.
Figure 4:
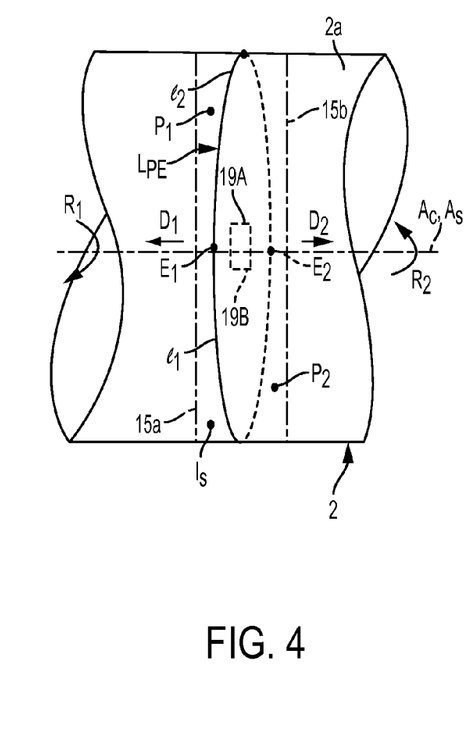
FIG. 4 is more diagrammatic view of the seal assembly having the sealing member of FIG. 3, shown rotated 90° from the view of FIG. 2 and depicting a contact pressure profile within a sealing interface.

Referring to FIGS. 3 and 4, in a first construction, the sealing member 12 has two projections 18 spaced apart circumferentially by about one hundred eighty degrees (180°) and providing one first projection 19A and one second projection 19B. As such, the contact pressure $P_C$ is exerted along a generally elliptical path $L_{PE}$ extending circumferentially about the shaft axis A. The pressure path $L_{PE}$ has two path sections $l_1$, $l_2$ each extending between a first point $E_1$ located proximal to the first projection 19A and a second point $E_2$ located proximal to the second projection 19B, the two sections $l_1$, $l_2$ being circumferentially spaced and connected at the two ends $E_1$, $E_2$.

With such a contact pressure distribution, a substance located within the seal interface $I_S$ at a point $p_1$ on the shaft outer surface 2a proximal to the sealing surface first end 15a is directed outwardly from the interface $I_S$ generally in a first direction $D_1$ along the axis $A_C$ as the shaft point $P_C$ displaces generally toward the first point $E_1$ and passes through one of the path sections $l_1$ or $l_2$ on the elliptical pressure path $L_{PE}$, depending on the direction of shaft rotation, as shown in FIG. 4. Alternatively, a substance located within the seal interface $I_S$ at a point $p_2$ on the shaft outer surface 2a proximal to the sealing surface second end 15b is directed outwardly from the interface $I_S$ generally in a second, opposing direction $D_2$ along the axis $A_C$ as the shaft point $p_2$ displaces generally toward the second point $E_2$ and passes through one of the elliptical pressure path sections $l_1$ or $l_2$. Although described in terms of an interaction with a pressure "path", the substances are actually diverted or displaced by the effect of relatively higher contact pressure within the sealing interface $I_S$ at the zones or sections defined by the pressure path $L_{PE}$, as described in detail in co-pending U.S. patent application Ser. No. 12/821,629.

Figure 5:
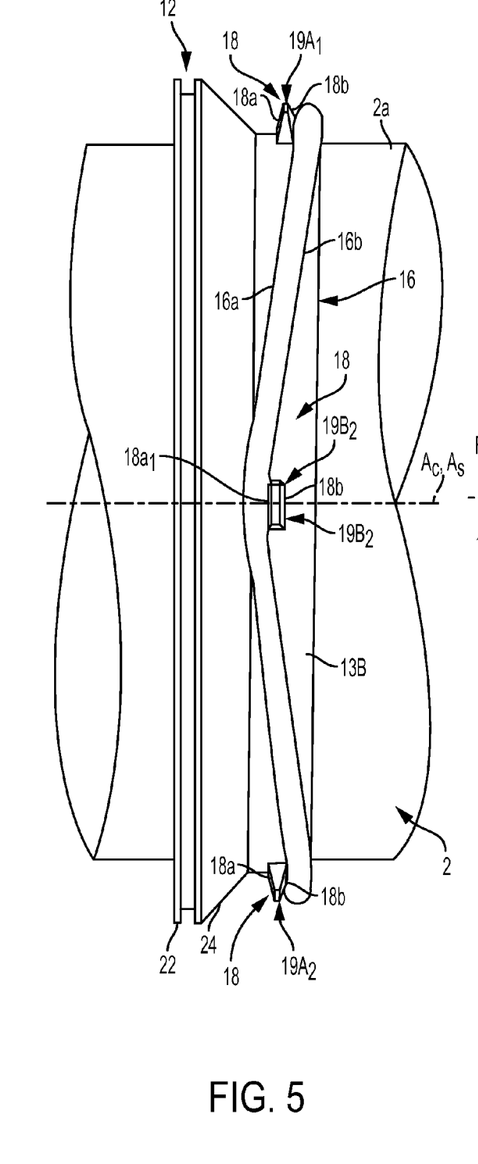
FIG. 5 is a side view of a second construction sealing member and the biasing member as mounted on a shaft, show separate from a casing.
Figure 6:
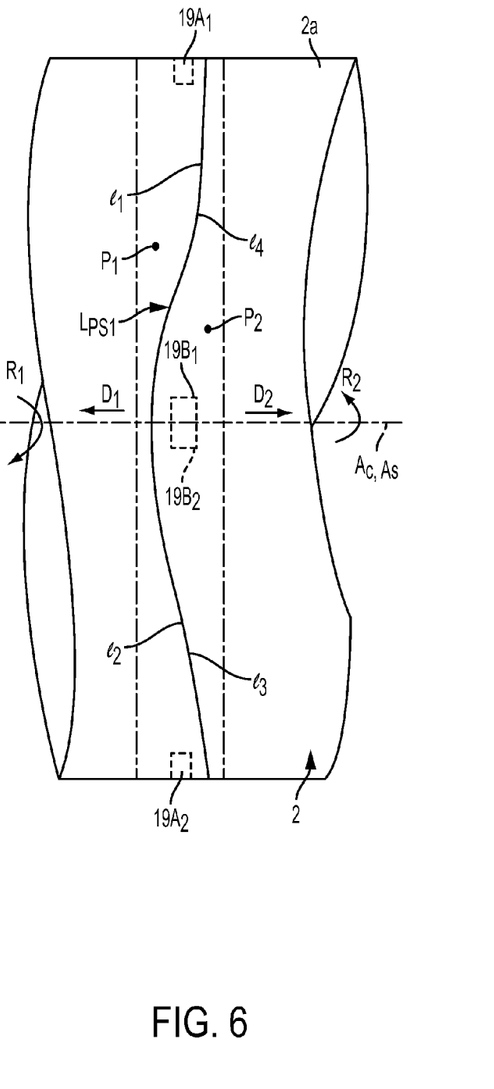
FIG. 6 is more diagrammatic view of the seal assembly having the sealing member of FIG. 5, depicting the contact pressure profile within the sealing interface.

Referring now to FIGS. 5 and 6, in a second construction, the sealing member 12 has four projections 18 circumferentially spaced apart from each other projection 18 by about ninety degrees (90°) and providing two first projections 19A and two second projections 19B (only one shown). With such projections 18, the biasing member 16 is bended or curved about each one of the four projections 18 such that the contact pressure $P_C$ is exerted along a generally sinusoidal pressure path $L_{PS1}$ extending circumferentially about the shaft axis $A_C$. The sinusoidal pressure path $L_{PS1}$ includes four path sections $l_1$, $l_2$, $l_3$ and $l_4$ each extending between a separate pair of associated first and second projections 19A, 19B. Specifically, a first path section $l_1$ extends between a first one $19A_1$ of the two first projections 19A and a first one $19B_1$ of the two second projections 19B. A second path section $l_2$ extends between the first one $19B_1$ of the two second projections 19B and a second one $19A_2$ of the two first projections 19A. Further, a third path section $l_3$ (shown hidden) extends between the second one $19A_2$ of the two first projections 19A and a second one $19B_2$ of the two second projections 19B. Furthermore, a fourth path section $l_4$ (shown hidden) extends between the second one $19B_2$ of the two second projections 19B and the first one $19A_1$ of the two first projections 19A.

With such a contact pressure profile, a substance or substances entering the sealing interface $I_S$ is/are pumped or directed outwardly from the interface $I_S$ by one of the pressure path sections $l_1$, $l_2$, $l_3$ and $l_4$, depending on the location of the substance and the direction $R_1$, $R_2$ of shaft rotation, as follows. Referring to FIG. 6, a substance located within the seal interface $I_S$ at a point $p_1$ on the shaft outer surface proximal to the sealing surface first end 15a is directed outwardly from the interface generally in a first direction $D_1$ along the shaft axis $A_C$ when the shaft point $p_1$ passes through one of the first and third pressure path sections $l_1$, $l_3$ during rotation in a first angular direction $R_1$, or when the shaft point $p_1$ passes through one of the second and fourth pressure path $l_2$, $l_4$ sections during rotation in a second, opposing angular direction $R_2$.

In other words, substances located near the sealing surface first end 15A are pumped outwardly by the first one of the first and third path sections $l_1$, $l_3$ that the point $p_1$ passes through when the shaft 2 rotates in the first direction $R_1$, but are directed outwardly by one of the second or fourth path sections $l_2$ or $l_4$ when the shaft 2 rotates in the second direction $R_2$. In any case, if the shaft point $p_1$ passes through either of the second and fourth path sections $l_2$, $l_4$ during shaft rotation in the first direction $R_1$ or through either of the first or third path sections $l_1$, $l_3$ during rotation in the second direction $R_2$, the substance is not axially displaced due to the orientation of these pressure path sections, as discussed in detail in co-pending U.S. patent application Ser. No. 12/821,629.

Further, a substance located within the seal interface at a point $p_2$ on the shaft outer surface 2a proximal to the sealing surface second end 15b is directed outwardly from the interface $I_S$ generally in a second, opposing direction $D_2$ along the shaft axis $A_C$ when the shaft point $p_2$ passes through one of the second and fourth pressure path sections during rotation in the first angular direction $R_1$, or when the shaft point $p_2$ passes through one of the first and third pressure path sections during rotation in a second, opposing angular direction. That is, substances entering the interface $I_S$ through the sealing surface second end 15B are pumped outwardly by the first one of the second or fourth path sections $l_2$, $l_4$ that the point $p_2$ passes through when the shaft 2 rotates in the first direction $R_1$, but are directed outwardly by the first or third path sections $l_1$, $l_3$ when the shaft rotates in the second direction $R_2$. Similarly as described above, if the shaft point $p_2$ passes through either of the first or third path sections $l_1$, $l_3$ during shaft rotation in the first direction $R_1$ or through either of the second or fourth path sections $l_2$, $l_4$ during rotation in the second direction $R_2$, the substance at the point $p_2$ is not axially displaced due to the orientation of these pressure path sections.

Figure 7:
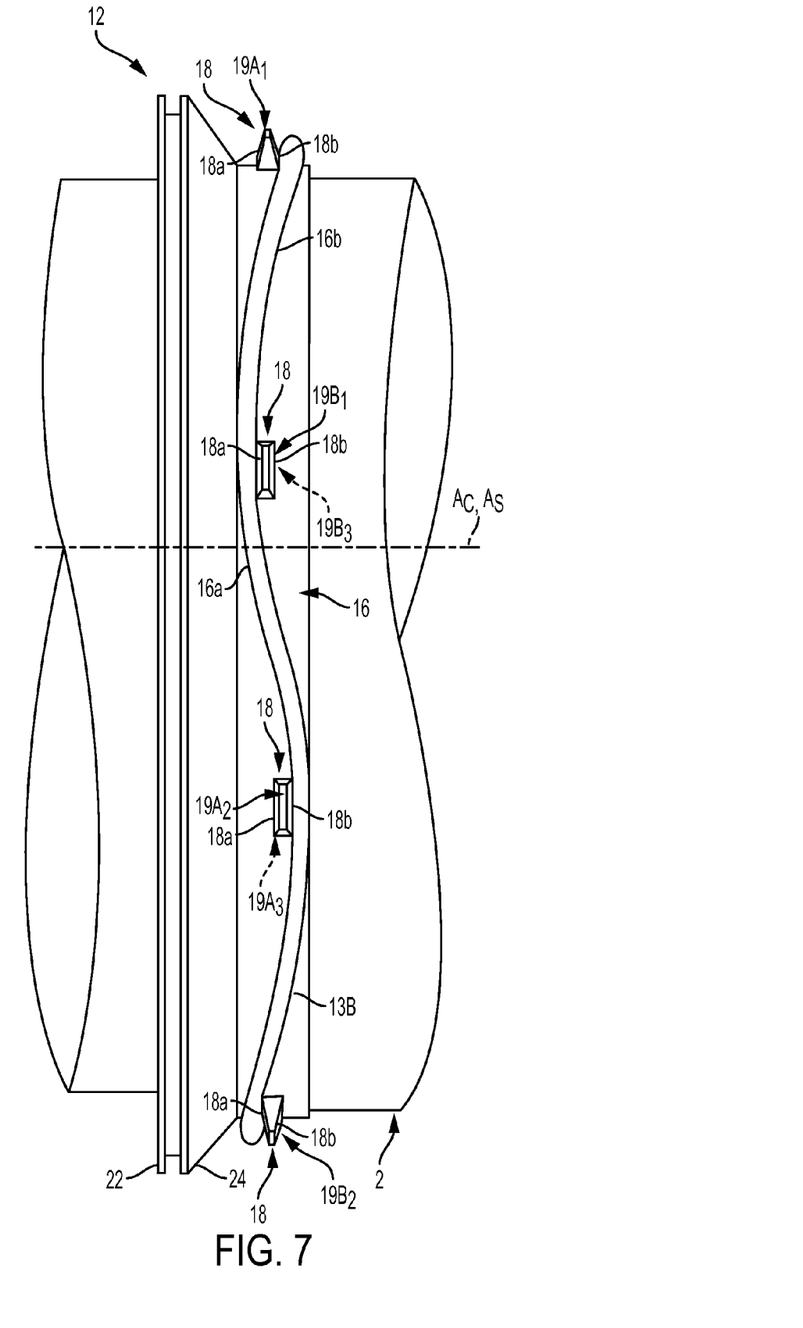
FIG. 7 is a side view of a third construction sealing member and the biasing member as mounted on a shaft, shown separate from the casing.
Figure 8:
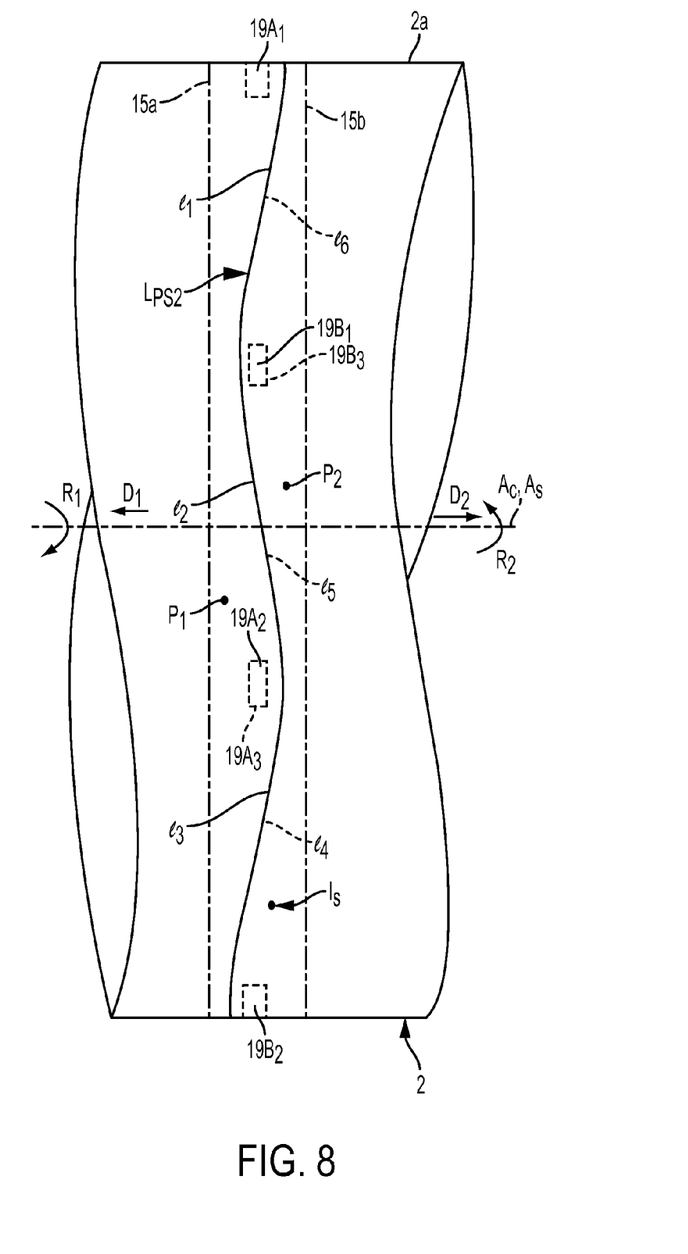
FIG. 8 is more diagrammatic view of the seal assembly having the sealing member of FIG. 7, depicting the contact pressure profile within the sealing interface.
Figure 9:
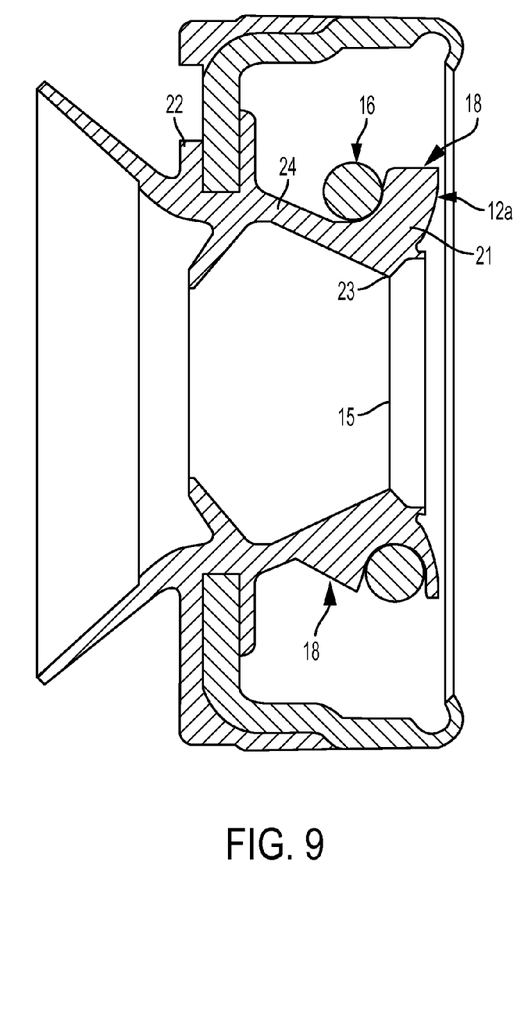
FIG. 9 is a more detailed, axial cross-sectional view of a preferred construction of the seal assembly of FIG. 1.

Referring to FIGS. 7 and 8, in a third construction, the sealing member includes six projections spaced circumferentially apart from each other by about sixty degrees (60°) and providing three first projections $19A_1$, $19A_2$, $19A_3$ and three second projections $19B_1$, $19B_2$, $19B_3$. With these six projections 18, the biasing member 16 is bended or curved about each one of the six projections 18 such that the contact pressure $P_C$ is exerted along a generally sinusoidal pressure path $L_{PS2}$ extending circumferentially about the shaft axis $A_C$, which has a greater number of "waves" compared with the pressure path $L_{PS1}$ described in detail above. The sinusoidal pressure path $L_{PS2}$ includes six path sections $l_1$, $l_2$, $l_3$, $l_4$, $l_5$, and $l_6$ each extending between a separate pair of associated first and second projections 19A, 19B. Specifically, a first path section $l_1$ extends between a first one $19A_1$ of the three first projections 19A and a first one $19B_1$ of three second projections 19B. A second path section $l_2$ extends between the first one $19B_1$ of the three second projections 19B and a second one $19A_2$ of the three first projections 19A. A third path section $l_3$ extends between the second one $19A_2$ of the three first projections 19A and a second one $19B_2$ of the three second projections 19B. Further, a fourth path section $l_4$ (shown hidden) extends between the second one $19B_2$ of the three second projections 19B and a third one $19A_3$ of the three first projections 19A. Furthermore, a fifth path section $l_5$ (shown hidden) extends between the third one $19A_3$ of the three first projections 19A and a third one $19B_3$ of the three second projections 19B. Finally, a sixth path section $l_6$ (shown hidden) extends between the third one $19B_3$ of the three second projections 19B and the first one $19A_1$ of the three first projections 19A.

With the above-described contact pressure profile or distribution, any substances entering the sealing interface $I_S$ are pumped/directed from the interface $I_S$ by one of the six pressure path sections, as follows. For substances entering the interface $I_S$ through the first sealing surface end 15a, so as to be located at a point $p_1$ on the shaft outer surface 2a proximal to the first sealing surface end 15a, the substance is pumped/directed outwardly from the sealing interface $I_S$ in a first axial direction $D_1$ when the shaft point $p_1$ passes through one of the first, third or fifth pressure path sections $l_1$, $l_3$, $l_5$ during rotation in the first angular direction $R_1$, or when the point $p_1$ passes through one of the second, fourth or sixth pressure path sections $l_2$, $l_4$, $l_6$ during rotation in the second angular direction $R_2$. Similarly, substances entering the interface $I_S$ through the second sealing surface end 15b, so as to be located at a point $p_2$ on the shaft outer surface 2a proximal to the second sealing surface end 15b, the substance is pumped/directed outwardly from the sealing interface $I_S$ in the second axial direction $D_2$ when the shaft point $p_2$ passes through one of the second, fourth or sixth pressure path sections $l_2$, $l_4$, $l_6$ during rotation in the first angular direction $R_1$, or when the point $p_2$ passes through one of the first, third or fifth pressure path sections $l_1$, $l_3$, $l_5$ during rotation in the second angular direction $R_2$.

Thus, the three constructions of the sealing member 12 each function in a substantially similar manner, except for differences in the rate of directing or pumping substances from the sealing interface $I_S$ for a given sealing member size. Specifically, both the second and third constructions of the sealing member 12 have a greater pumping rate or "frequency" than the first sealing member construction, and the third construction has a greater pumping rate than the second construction, due to the greater number of path sections for a given sized sealing member 12. As such, the second and third construction sealing members 12 may be particularly suitable for larger diameter shafts 2, or shafts 2 rotating at a lesser rate, to ensure that no substances migrate between the two sides $S_1$, $S_2$ of the seal 10. Further, although three constructions are described and depicted herein, it must be noted that the sealing member 12 may be formed with any number of projections, preferably an even number of projections 18 to ensure proper positioning of the biasing member 16, such as for example, eight projections 18, ten projections 18, twelve projections 18, etc.

Referring now to FIGS. 1, 3, 5 and 7, in each of the above constructions, the sealing member 12 is preferably formed such that all of the projections 18, i.e., all first and second projections 19A, 19B, are generally axially aligned so as to extend about a common circumferential line (not indicated). As such, the biasing member 16 is axially directed or bended merely by contact with opposing sides 18a, 18b of the first and second projections 19A, 19B. Alternatively, the sealing member 12 may be formed such that each of the first projections 19A is spaced axially with respect to each one of the second projections 19B so as to define an axial spacing gap (not shown). In such a case, the magnitude of the spacing gap $G_S$ may be varied for different seal constructions in order to accommodate different desired sealing surfaces 15 (and thus sealing interfaces $I_S$), such that the spacing can be made relatively greater for a wider sealing surface 15 and relatively lesser for a smaller sealing surface 15. In all cases or constructions, the sealing member 12 is preferably formed such that each first projection 19A is axially aligned with each other first projection 19B and each second projection 19B is axially aligned with each other second projection 19B, such that each type of projection 19A or 19B is spaced about a common circumferential line (not indicated).

Referring to FIGS. 1, 2, 9 and 10, the sealing member 12 preferably includes a base portion 22 coupleable with the housing 1, preferably through a casing 26, and a cantilever portion 24 connected with the base portion 22 and providing the inner and outer circumferential surfaces 14, 16 and the plurality of projections 18. The cantilever portion 24 is deflectable relative to the base portion 22 and the biasing member 16 is configured to bias the cantilever portion 24 generally radially inwardly so as to maintain contact between the sealing surface 15 and the shaft outer surface 2a. Although preferably including base and cantilever portions 22, 24, the sealing member 14 may be formed in any other appropriate manner that enables the seal assembly 10 to function generally as described herein.

Figure 1:
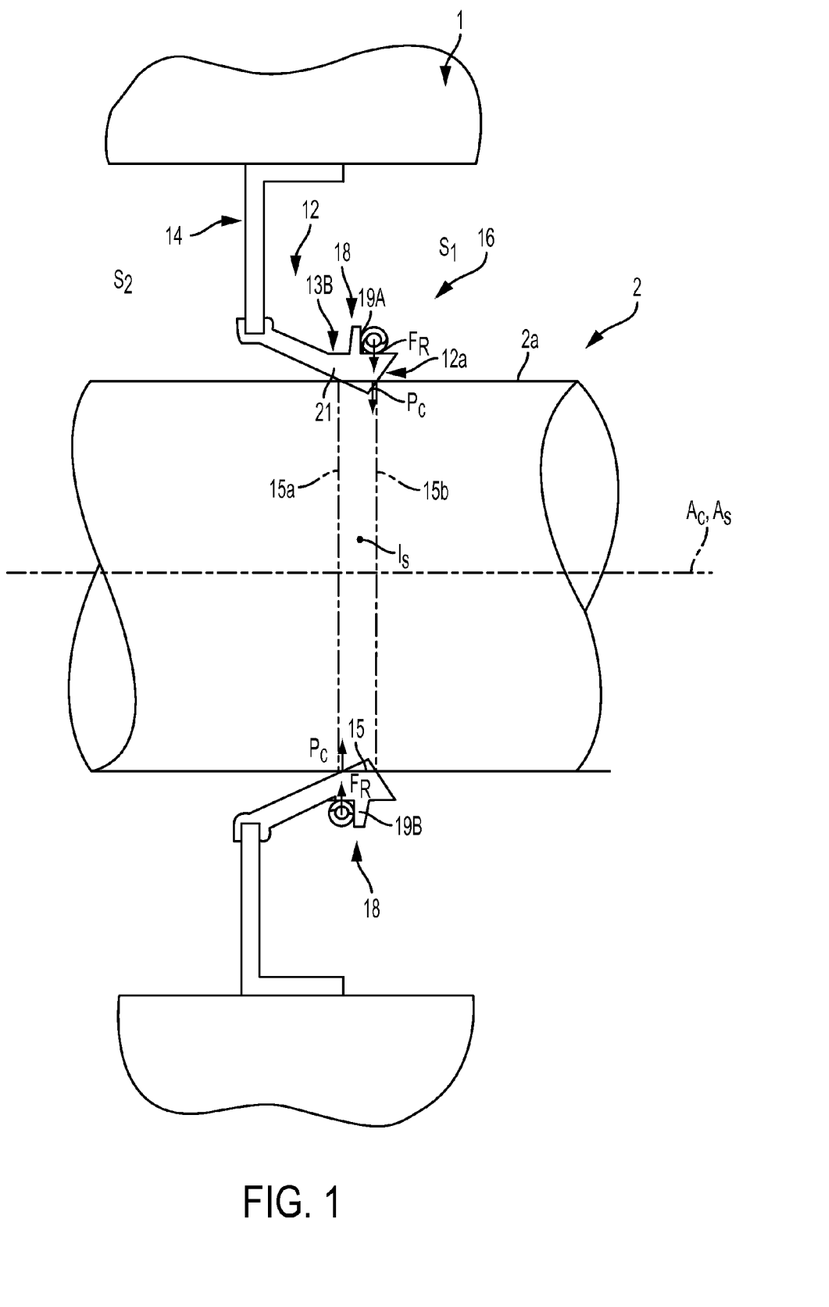
FIG. 1 is an axial cross-section of a seal assembly in accordance with the present invention, shown as a radial shaft seal.
Figure 2:
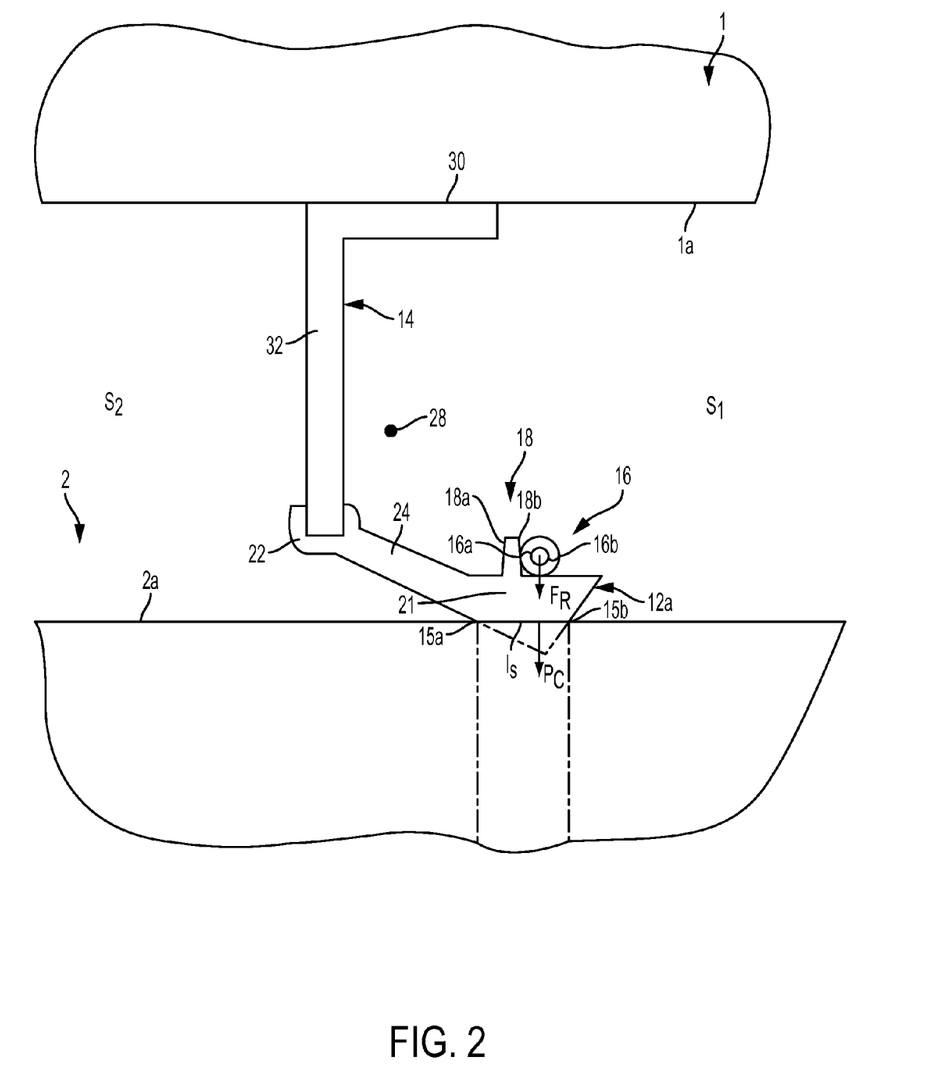
FIG. 2 is an enlarged, broken-away view of an upper portion of FIG. 1.

In one preferred construction, as shown in FIGS. 1-9, the seal assembly 10 is formed as a modified version of a radial shaft seal or radial lip seal, with the sealing member 12 having an engagement portion 21 proximal one axial end 12a and extending radially inwardly from a remainder of the sealing member 12. The engagement portion 21 is preferably formed having generally triangular-shaped axial cross-sections and an inner radial end 21a providing the sealing surface 15, and typically has a bead or lip 23 (see FIG. 9) which becomes compressed against the shaft outer surface 2a during assembly, as best shown in FIG. 2. Alternatively, the seal assembly 10 may be formed as a modified version of a wafer seal having a sealing member 12 with a generally cylindrical inner surface section 25 providing the sealing surface 15, as depicted in FIG. 10.

Further, as noted above, the seal assembly 10 preferably further comprises the casing 14, as noted above, which is preferably generally annular and has an interior cavity 28 configured to receive the sealing member base portion 22 and an outer circumferential surface 30 engageable with an inner circumferential surface 1a of the housing 1 so as to couple the sealing member 12 with the housing 1. Preferably, the casing 26 has a generally radially-inwardly extending shoulder 32 with a central opening sized to receive the shaft 2, the sealing member 12 being attached to the shoulder, most preferably bonded thereto. Furthermore, the casing 26 is preferably formed of a metallic material, such as low carbon steel, and the sealing member 12 is preferably formed of an elastomeric material, such as natural or synthetic rubber, particularly when constructed as a radial shaft seal, or another polymer such as PTFE, or Nitrile, particularly when formed as a wafer seal.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

We claim:
1. A seal assembly for sealing a space between a housing and a rotary shaft disposed at least partially within the housing, the seal assembly comprising:
   a generally annular sealing member coupled with the housing and having a central axis, inner and outer circumferential surfaces and a plurality of projections extending generally radially outwardly from the outer surface and spaced circumferentially apart about the central axis, each projection having opposing first and second axial ends and the plurality of projections defining at least one first projection and at least one second projection; and
   a generally annular biasing member disposed about the sealing member outer surface and configured to exert a radially-inwardly directed force on the sealing member, the biasing member having opposing first and second ends and being arranged on the sealing member with the biasing member first end contacting the second end of each first projection and the biasing member second end contacting the first end of each second projection such that the biasing member extends axially and circumferentially between the first and second projections.

2. The seal assembly as recited in claim 1 wherein:
   at least a section of the sealing member inner surface provides a sealing surface having opposing axial ends and being slidably contactable with the shaft outer surface so as to define a sealing interface; and
   the force exerted by the biasing member on the sealing member generates a contact pressure between the sealing member and the shaft within the sealing interface, the contact pressure extending at least partially along the shaft axis so as to direct a substance entering the sealing interface toward a proximal one of the two axial ends of the sealing surface when the shaft rotates about the central axis.

3. The seal assembly as recited in claim 2 wherein the plurality of projections includes two projections spaced apart circumferentially by about one hundred eighty degrees and providing one first projection and one second projection, the contact pressure being exerted along a generally elliptical path extending circumferentially about the shaft axis and having a first point located proximal to the first projection and a second point located proximal to the second projection.

4. The seal assembly as recited in claim 3 wherein:
   a substance located within the seal interface at a point on the shaft outer surface proximal to the sealing surface first end is directed outwardly from the interface generally in a first direction along the axis as the shaft point displaces generally toward the first point on the elliptical path; and
   a substance located within the seal interface at a point on the shaft outer surface proximal to the sealing surface second end is directed outwardly from the interface generally in a second opposing direction along the axis as the shaft point displaces generally toward the second point on the elliptical path.

5. The seal assembly as recited in claim 2 wherein the plurality of projections includes four projections circumferentially spaced apart by about ninety degrees and providing two first projections and two second projections, the biasing member being bended about each one of the four projections such that the contact pressure is exerted along a generally sinusoidal pressure path extending circumferentially about the shaft axis.

6. The seal assembly as recited in claim 5 wherein the sinusoidal pressure path includes a first path section extending between a first one of the two first projections and a first one of the two second projections, a second path section extending between the first one of the two second projections and a second one of the two first projections, a third path section extending between the second one of the two first projections and a second one of the two second projections, and a fourth path section extending between the second one of the two second projections and the first one of the two first projections.

7. The seal assembly as recited in claim 6 wherein:
a substance located within the seal interface at a point on the shaft outer surface proximal to the sealing interface first end is directed outwardly from the interface generally in a first direction along the shaft axis when one of:
the shaft point passes through one of the first and third pressure path sections during rotation in a first angular direction; and
the shaft point passes through one of the second and fourth pressure path sections during rotation in a second, opposing angular direction; and
a substance located within the seal interface at a point on the shaft outer surface proximal to the sealing interface second end is directed outwardly from the interface generally in a second, opposing direction along the shaft axis when one of:
the shaft point passes through one of the second and fourth pressure path sections during rotation in the first angular direction; and
the shaft point passes through one of the first and third pressure path sections during rotation in a second, opposing angular direction.

8. The seal assembly as recited in claim 2 wherein the plurality of projections includes six projections spaced circumferentially apart by about sixty degrees and providing three first projections and three second projections, the biasing member being bended about each one of the six projections such that the contact pressure is exerted along a generally sinusoidal pressure path extending circumferentially about the shaft axis.

9. The seal assembly as recited in claim 8 wherein the sinusoidal pressure path has a first path section extending between a first one of the three first projections and a first one of three second projections, a second path section extending between the first one of the three second projections and a second one of the three first projections, a third path section extending between the second one of the three first projections and a second one of the three second projections, a fourth path section extending between the second one of the three second projections and a third one of the three first projections, a fifth path section extending between the third one of the three first projections and a third one of the three second projections, and a sixth path section extending between the third one of the three second projections and the first one of the three first projections.

10. The seal assembly as recited in claim 9 wherein:
a substance located within the seal interface at a point on the shaft outer surface proximal to the sealing interface first end is directed outwardly from the interface generally in a first direction along the shaft axis when one of:
the shaft point passes through one of the first, third and fifth pressure path sections during rotation in a first angular direction; and
the shaft point passes through one of the second, fourth and sixth pressure path sections during rotation in a second, opposing angular direction; and
a substance located within the seal interface at a point on the shaft outer surface proximal to the sealing interface second end is directed outwardly from the interface generally in a second, opposing direction along the shaft axis when one of:
the shaft point passes through one of the second, fourth and sixth pressure path sections during rotation in the first angular direction; and
the shaft point passes through one of the first, third and fifth pressure path sections during rotation in a second, opposing angular direction.

11. The seal assembly as recited in claim 1 wherein each projection is formed as a generally rectangular tab having opposing circumferentially-extending radial surfaces providing the first and second ends.

12. The seal assembly as recited in claim 1 wherein the sealing member includes a base portion coupleable with the housing and cantilever portion connected with the base portion and providing the inner circumferential sealing surface and the outer circumferential surface, the cantilever portion being deflectable relative to the base portion and the biasing member being configured to bias the cantilever portion generally radially inwardly so as to maintain contact between the sealing surface and the shaft outer surface.

13. The seal assembly as recited in claim 1 wherein the biasing member is one of a garter spring and an elastomeric ring.

14. The seal assembly as recited in claim 1 further comprising a generally annular casing having an interior cavity configured to receive the sealing member base and an outer circumferential surface engageable with an inner circumferential surface of the housing so as to couple the sealing member with the housing.

15. A method of pumping fluid with a seal assembly for sealing a space between a rotatable shaft and a housing, the pumping method comprising the steps of:
providing a generally annular sealing member having a central axis, inner and outer circumferential surfaces, at least a portion of the inner surface providing a sealing surface with opposing axial ends, and a plurality of projections extending generally radially outwardly from the outer surface and spaced circumferentially apart about the central axis, each projection having opposing first and second axial ends and the plurality of projections defining at least one first projection and at least one second projection;
providing a generally annular biasing member having opposing first and second ends and configured to exert a radially-inwardly directed force when deflected radially outwardly;
mounting the sealing member on the shaft such that the sealing surface is engaged with the outer surface of the shaft so as to define a sealing interface;
mounting the biasing member on the sealing member such that the biasing member first end contacts the second end of each first projection and the biasing member second end contacts the first end of each second projection so that the biasing member extends axially and circumferentially between the first and second projections, the biasing member exerting the radially-inwardly directed force on the sealing member such that the force generates a contact pressure between the sealing member and the shaft within the sealing interface; and
rotating the shaft within the seal such that the contact pressure directs any fluid entering the sealing interface toward a proximal one of the two axial ends of the sealing surface.

* * * * *